(12) United States Patent
Hachiya et al.

(10) Patent No.: US 8,368,374 B2
(45) Date of Patent: Feb. 5, 2013

(54) COMPARATOR TYPE DC-DC CONVERTER USING SYNCHRONOUS RECTIFICATION METHOD

(75) Inventors: Shogo Hachiya, Tokyo (JP); Ko Takemura, Tokyo (JP)

(73) Assignee: Thine Electronics, Inc., Tokyo (JP)

( * ) Notice: Subject to any disclaimer, the term of this patent is extended or adjusted under 35 U.S.C. 154(b) by 0 days.

(21) Appl. No.: 13/148,609

(22) PCT Filed: Jan. 6, 2010

(86) PCT No.: PCT/JP2010/050066
§ 371 (c)(1),
(2), (4) Date: Nov. 10, 2011

(87) PCT Pub. No.: WO2010/092843
PCT Pub. Date: Aug. 19, 2010

(65) Prior Publication Data
US 2012/0062201 A1    Mar. 15, 2012

(30) Foreign Application Priority Data
Feb. 10, 2009  (JP) .................................. 2009-028627

(51) Int. Cl.
*G05F 1/40* (2006.01)

(52) U.S. Cl. .......................... 323/283; 323/271; 323/284

(58) Field of Classification Search .................. 323/222, 323/225, 271, 282–285, 351
See application file for complete search history.

(56) References Cited

U.S. PATENT DOCUMENTS

| 5,410,467 | A  |    | 4/1995  | Smith et al.   |         |
|-----------|----|----|---------|----------------|---------|
| 6,815,939 | B2 | *  | 11/2004 | Umemoto et al. | 323/286 |
| 7,224,152 | B2 | *  | 5/2007  | Hasegawa       | 323/282 |
| 7,408,333 | B2 | *  | 8/2008  | Chen et al.    | 323/283 |
| 7,755,342 | B2 | *  | 7/2010  | Chen et al.    | 323/283 |
| 7,990,122 | B2 | *  | 8/2011  | Sase et al.    | 323/283 |
| 8,164,318 | B2 | *  | 4/2012  | Sasaki et al.  | 323/283 |

FOREIGN PATENT DOCUMENTS

| JP | 7213050    | A | 8/1995 |
| JP | 2005261039 | A | 9/2005 |
| JP | 2007185050 | A | 7/2007 |

OTHER PUBLICATIONS

Korean Notice of Allowance issued Nov. 23, 2012 in corresponding Korean Application No. 10-2011-7016661.

\* cited by examiner

*Primary Examiner* — Jessica Han
(74) *Attorney, Agent, or Firm* — Sughrue Mion, PLLC

(57) ABSTRACT

A DC-DC converter 1 is provided with a voltage conversion unit 100 and a control unit 200. The control unit 200 includes: a comparator 20 and a trigger signal generation section 30 which generate a trigger signal when an output voltage is reduced from a reference voltage after having received a minimum off-time signal, a DLL section 40 generating a reference delay signal, a delay section 50 generating delay signals which are delayed from the trigger signal by a predetermined amount, further delayed by an on-time, still further delayed by a second dead time, and yet still further delayed by a minimum off-time, respectively, according to the reference delay signal, and a timing control section 60 determining a start time point and an end time point of an on-pulse, a start time point and an end time point of an off-pulse and also generating a minimum off-time signal, according to these delay signals.

4 Claims, 10 Drawing Sheets

(a) Cref5
(b) Vup
(c) SSWHG
(d) Vdown
(e) Sf

COMPARATOR TYPE DC-DC CONVERTER USING SYNCHRONOUS RECTIFICATION METHOD

CROSS REFERENCE TO RELATED APPLICATIONS

This application is a National Stage of International Application No. PCT/JP2010/050066, filed on Jan. 6, 2010, which claims priority from Japanese Patent Application No. 2009-028627, filed on Feb. 10, 2009, the contents of all of which are incorporated herein by reference in their entirety.

TECHNICAL FIELD

The present invention relates to a comparator type DC-DC converter using a synchronous rectification method.

BACKGROUND ART

There is known a DC-DC converter generating a stable output voltage from an input voltage. The DC-DC converter includes a voltage conversion unit generating an output voltage obtained by voltage-converting an input voltage by switching a switching element and a control unit controlling the switching of the switching element for stabilizing the output voltage of the voltage conversion unit.

The configuration of the voltage conversion unit includes a configuration of using a switching element on a high side and using a diode on a low side, a configuration of using switching elements on the high side and the low side, that is, a configuration of using a synchronous rectification method, and the like. In this synchronous rectification method, a switching element having a smaller voltage drop amount than a diode is used also on the low side, and thereby power conversion efficiency can be improved. Patent literature 1 discloses a DC-DC converter using the synchronous rectification method in the voltage conversion unit. In this DC-DC converter using the synchronous rectification method, for preventing short circuit from occurring when the two switching elements are turned on at the same time, there is provided a period when these switching elements are turned off at the same time, that is, a dead time.

Meanwhile, the control means of the control unit includes, for example, a means of using a PWM (pulse width modulation) method, a means of using a comparator method, and the like. The means of using the PWM method keeps the switching frequency of the switching element constant and adjusts an on-pulse width to stabilize the output voltage of the voltage conversion unit. On the other hand, the comparator method keeps the on-pulse width of the switching element constant using a comparator and adjusts an off-pulse width (i.e., switching frequency) to stabilize the output voltage of the voltage conversion unit.

Because of a difference between these control means, the comparator method has an advantage over the PWM method as follows. The DC-DC converter is sometimes used as a voltage source of a PU (Processor Unit) or the like. In the PU, consumption current is increased abruptly when the PU shifts from a waiting state to a processing state. When an output voltage is reduced abruptly by the abrupt increase of a load current, the comparator type DC-DC converter outputs the on-pulse instantly when detecting the reduction of the output voltage by the comparator and thereby stabilizes the output voltage more quickly than the PWM method which cannot output the pulse during a predetermined off-pulse period. In this manner, the comparator method has an advantage over the PWM method in that a response characteristic thereof for the abrupt increase of the load current is better.

This comparator type DC-DC converter is provided with an on-time for determining the fixed on-pulse width and a minimum off-time for determining the minimum off-pulse width. This minimum off-time is provided from the following reason. In the comparator type DC-DC converter, when ON/OFF is switched in the switching element, a power source voltage sometimes varies on a high potential side due to the switching of operation states in a drive circuit for driving the switching element. In particular, when the switching element on the high side is switched from ON to OFF and the switching element on the low side is switched from OFF to ON, that is, when the output voltage is reduced lower than a reference voltage, the comparator is operated. At this time, when a power source voltage and a reference voltage for the comparator vary due to power source voltage variation on the high potential side, there is a possibility that the comparator is operated erroneously. Accordingly, the minimum off-time is provided for preventing the converter from switching to the on-pulse generation, that is, for continuing the off-pulse generation during a predetermined period until the respective variations in the power source voltage on the high potential side and the reference voltage are reduced, even when the comparator is operated erroneously.

CITATION LIST

Patent Literature

Patent literature 1: Japanese Patent Application Laid-Open Publication No. 2007-185050

SUMMARY OF INVENTION

Technical Problem

However, the comparator type DC-DC converter using the synchronous rectification method needs to be provided with plural analog type delay circuits each composed of a resistor element and a capacitor element for providing the dead time, the on-time, and the minimum off-time which have values different from one another, and it has been difficult to reduce the size and the cost thereof.

Further, when the analog type delay circuit is configured within a semiconductor, a delay time, that is, each of the dead time, the on-time, and the minimum off-time, of the analog type delay circuit is not sufficiently accurate due to respective production variations or temperature variations of the resistor element and the capacitor element. For improving the accuracy of the delay time in the analog type delay circuit, the delay time could be adjusted by the use of a trimming circuit element for the analog type delay circuit, but this further prevents the reduction in the size and the cost.

Accordingly, the present invention aims at providing a comparator type DC-DC converter using the synchronous rectification method, which can improve the accuracy of the on-time, the minimum off-time, and the dead time without preventing the reduction in the size and the cost.

Solution to Problem

A comparator-type DC-DC converter using a synchronous rectification method of the present invention comprises: a voltage conversion unit which includes a switching element and generates an output voltage obtained by voltage-converting an input voltage by controlling the switching element according to a control signal; and a control unit generating the control signal for stabilizing the output voltage of the voltage conversion unit, and the control unit includes: a comparator detecting that the output voltage of the voltage conversion unit becomes smaller than a reference voltage; a trigger signal generation section generating a trigger signal when receiving an output signal from the comparator after having received a minimum off-time signal; a DLL section generating a reference delay clock which is a reference clock delayed by a reference delay amount and also generating a reference delay signal having a value corresponding to the reference delay amount; a delay section generating: a trigger delay signal which is delayed from the trigger signal output from the trigger signal generation section by a predetermined delay amount; a first dead time delay signal which is delayed from the trigger delay signal by a delay amount corresponding to a desired first dead time; an on-time delay signal which is delayed from the first dead time delay signal by a delay amount corresponding to a desired on-time; a second dead time delay signal which is delayed from the on-time delay signal by a delay amount corresponding to a desired second dead time; and a minimum off-time delay signal which is delayed from the second dead time delay signal by a delay amount corresponding to a desired minimum off-time, according to the reference delay signal from the DLL section; and a timing control section: determining an end time point of an off-pulse in the control signal according to the trigger delay signal from the delay section; determining a start time point of an on-pulse in the control signal according to the first dead time delay signal from the delay section; determining an end time point of the on-pulse according to the on-time delay signal from the delay section; determining a start time point of the off-pulse according to the second dead time delay signal from the delay section; and generating the minimum off-time signal according to the minimum off-time delay signal from the delay section.

In this comparator type DC-DC converter using the synchronous rectification method, the DLL section and the delay section which determine the dead time, the on-time, and the minimum off-time can be configured with one DSP (Digital Signal Processor), for example, and thereby the size and the cost of the control unit can be reduced compared with a case of using the plural conventional analog type delay circuits each composed of the resistor element and the capacitor element.

Further, in this comparator type DC-DC converter using the synchronous rectification method, the delay section determines the dead time, the on-time, and the minimum off-time according to the reference delay signal from the DLL section, thereby it is possible to improve the respective accuracies of the dead time, the on-time, and the minimum off-time which are determined by the delay section only by improving the accuracy of the reference delay amount of this reference delay signal, that is, only by improving the accuracy of the DLL section. Accordingly, the respective accuracies of the dead time, the on-time, and the minimum off-time can be improved without preventing the reduction in the size and the cost compared with a case of using the trimming circuit element in each of the plural conventional plural analog type delay circuits.

Preferably, the above described the DLL section includes: a DLL reference section generating the reference delay clock which is the reference clock delayed by the reference delay amount; a DLL delay section generating a DLL delay clock which is the reference clock delayed according to the reference delay signal; and a DLL comparator section generating the reference delay signal having a value corresponding to a difference between the phase of the reference delay clock and the phase of the DLL delay clock, and the DLL section generates the reference delay signal having the value corresponding to the reference delay amount by generating the reference delay signal so that the phase of the DLL delay clock coincides with the phase of the reference delay clock.

By this configuration, it is possible to generate the reference delay signal having a highly accurate reference delay amount only by improving the accuracy of the DLL section. Accordingly, it is possible to improve the respective accuracies of the dead time, the on-time, and the minimum off-time without preventing the reduction of the size and the cost.

Preferably, the above described delay section includes: a delaying delay section generating plural delaying delay clocks which have different delay amounts from the trigger signal output from the trigger signal generation section according to the reference delay signal from the DLL section; and a counter section generating frequency-divided clocks which are obtained by frequency-dividing the plural delaying delay clocks from the delaying delay section, and the delay section determines the trigger delay signal, the first dead time delay signal, the on-time delay signal, the second dead time delay signal, and the minimum off-time delay signal from the plural delaying delay clocks and the frequency-divided clocks.

By this configuration, the counter section generates the frequency-divided clocks from the delay clocks generated by the delaying delay section, and it is possible to reduce the number of the delay clocks generated by the delaying delay section. That is, it is possible to reduce a circuit size of the delaying delay section. Accordingly, the size and the cost of the control unit can be further reduced.

Preferably, the above described timing control section includes: an off-pulse end comparator section generating an off-pulse end signal indicating an end time point of the off-pulse in the control signal according to the trigger delay signal from the delay section; an on-pulse start comparator section generating an on-pulse start signal indicating a start time point of the on-pulse in the control signal according to the first dead time delay signal from the delay section; an on-pulse end comparator section generating an on-pulse end signal indicating an end time point of the on-pulse according to the on-time delay signal from the delay section; an off-pulse start comparator section generating an off-pulse start signal indicating a start time point of the off-pulse according to the second dead time delay signal from the delay section; a minimum off-time comparator section generating the minimum off-time signal according to the minimum off-time delay signal from the delay section; an on-pulse logic operation section generating the on-pulse in the control signal by performing logic operation between the on-pulse start signal and the on-pulse end signal; and an off-pulse logic operation section generating the off-pulse in the control signal by performing logic operation between the off-pulse end signal and the off-pulse start signal.

By this configuration, for example, the timing control section can be configured with the same DSP as the DSP configuring the DLL section and the delay section, and the size and the cost of the control unit can be further reduced.

Advantageous Effects of Invention

By the present invention, the respective accuracies of the on-time, the minimum off-time, and the dead time can be improved without preventing the size and cost reduction of the comparator type DC-DC converter using the synchronous rectification method.

DESCRIPTION OF EMBODIMENTS

Figure 1:
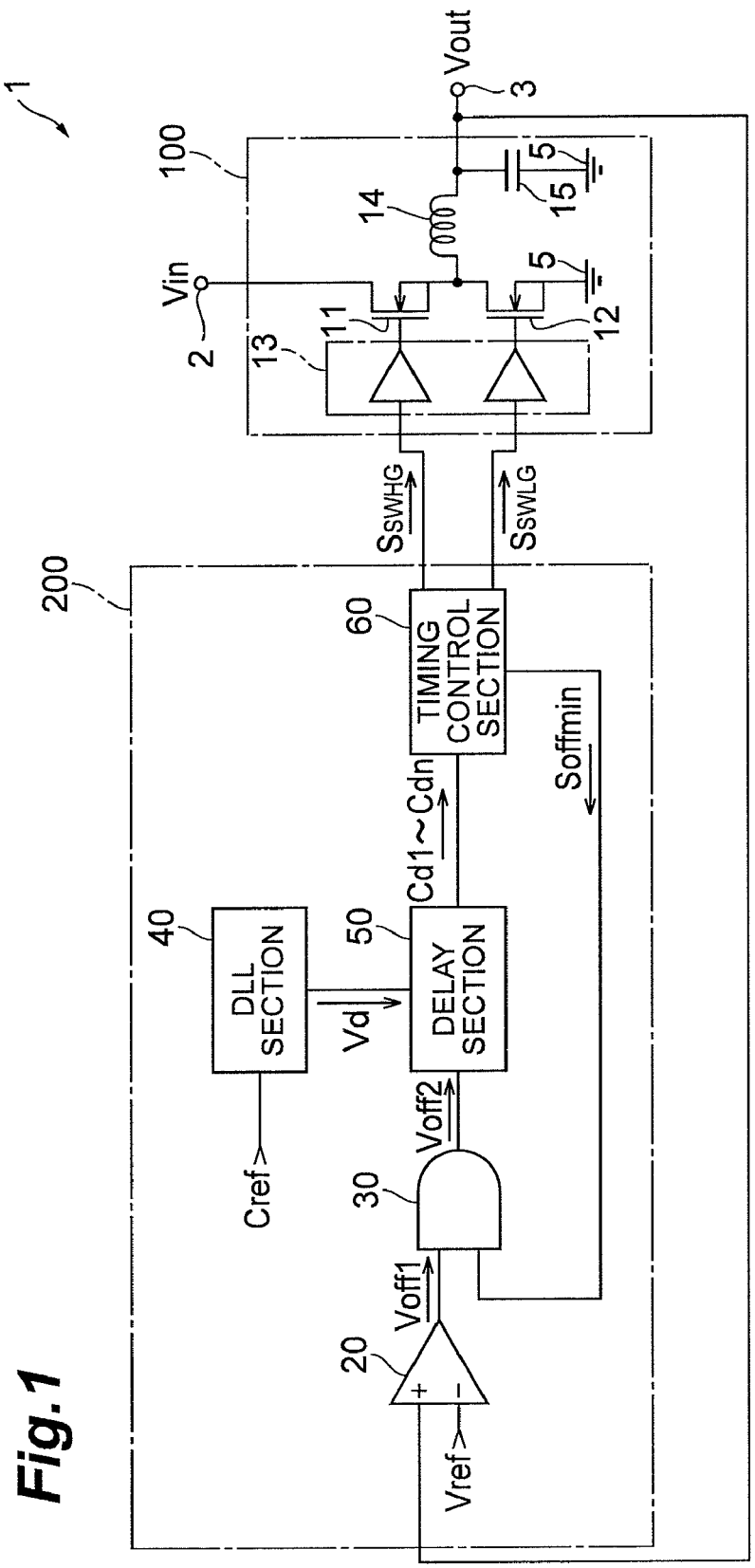
FIG. 1 is a circuit diagram showing a comparator type DC-DC converter according to a first embodiment of the present invention.

Hereinafter, preferable embodiments of the present invention will be explained in detail with reference to the drawings. Note that the same part or a corresponding part is denoted by the same reference numeral in each of the drawings.

First Embodiment

FIG. 1 is a circuit diagram showing a comparator type DC-DC converter using the synchronous rectification method according to a first embodiment of the present invention. The DC-DC converter 1 shown in FIG. 1 is configured with a voltage conversion unit 100 and a control unit 200.

The voltage conversion unit 100 is configured as a synchronous rectifier circuit and generates an output voltage Vout at an output terminal 3, which output voltage Vout is voltage-converted from an input voltage Vin input at an input terminal 2 according to switching control signals $S_{SWHG}$ and $S_{SWLG}$ from the control unit 200. The voltage conversion unit 100 is provided with two switching elements 11 and 12, a drive circuit 13, a coil 14, and a capacitor element 15.

Each of the switching elements 11 and 12 is an N-type MOSFET. The drain of the switching element 11 on the high side is connected to the input terminal 2 and the source is connected to the drain of the switching element 12 on the low side. The source of the switching element 12 is earthed to GND 5. The respective gates of the switching elements 11 and 12 are connected to the drive circuit 13.

The drive circuit 13 receives the switching control signals $S_{SWHG}$ and $S_{SWLG}$ from the control unit 200 and supplies the switching control signals $S_{SWHG}$ and $S_{SWLG}$ to the gates of the switching element 11 and 12, respectively. In the present embodiment, the drive circuit 13 is provided with a booster circuit for a drive signal supplied to an amplifier and the switching element 11.

The source of the switching element 11 and the drain of the switching element 12 are connected with one end of the coil 14. The other end of the coil 14 is connected to the output terminal 3. The capacitor element 15 is connected between the output terminal 3 and the GND 5 for smoothing the output voltage.

The control unit 200 employs the comparator method and generates the switching control signals $S_{SWHG}$ and $S_{SWLG}$ for stabilizing the output voltage Vout of the voltage conversion unit 100. The control unit 200 is provided with a comparator 20, a trigger signal generation section 30, a DLL section 40, a delay section 50, and a timing control section 60.

The plus input terminal of the comparator 20 is connected to the output terminal 3 of the voltage conversion unit 100 and a reference voltage Vref is input to the minus input terminal. The comparator 20 compares the output voltage Vout from the voltage conversion unit 100 and the reference voltage Vref and generates a pulse voltage Voff for ending an off-pulse in the switching control signals $S_{SWHG}$ and $S_{SWLG}$ when the output voltage Vout becomes smaller than the reference voltage Vref. The output terminal of the comparator 20 is connected to one input terminal of the trigger signal generation section 30.

A minimum off-time signal is input to the other input terminal of the trigger signal generation section 30 from the timing control section 60. The trigger signal generation section 30 is configured as an AND circuit and generates a pulse trigger voltage (trigger signal) Voff2 for ending the off-pulse in the switching control signals $S_{SWHG}$ and $S_{SWLG}$ when receiving a pulse voltage Voff1 after having received the minimum off-time signal. The output terminal of the trigger signal generation section 30 is connected to the input terminal of the delay section 50.

In this manner, the comparator 20 and the trigger signal generation section 30 output the trigger voltage Voff2 to the delay section 50 for increasing the output voltage Vout, that is, for generating an on-pulse when the output voltage Vout becomes smaller than the reference voltage Vref. Then, as will be described later, the switching control signal $S_{SWLG}$ exhibits a low level using this trigger voltage Voff2 as a trigger, and the switching control signal $S_{SWHG}$ exhibits a high level after a dead time for preventing breakthrough of the switching elements 11 and 12.

While the present embodiment shows an example of using the comparator 20 and the trigger signal generation section 30, the comparator 20 and the trigger signal generation section 30 only may generate a signal for a shift to the next pulse generation sequence as described above, and various circuit designs can be applied instead of the comparator 20 and the trigger signal generation section 30.

The DLL section 40 receives a reference clock Cref and generates a reference delay clock Cref2 which is the reference clock Cref delayed by a reference delay amount. Further, the DLL section 40 generates a reference delay voltage (reference delay signal) Vd having a value corresponding to the reference delay amount.

Figure 2:
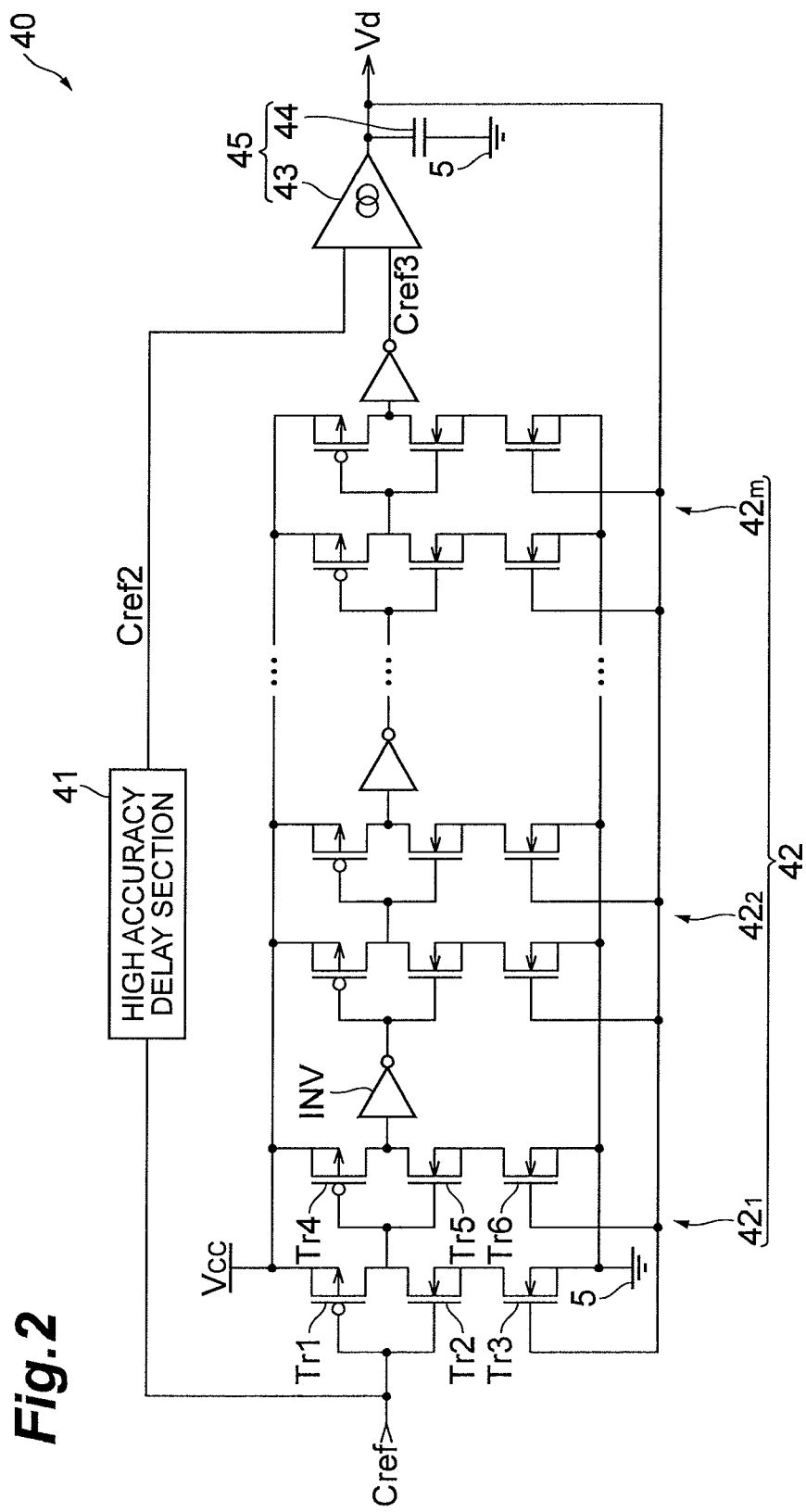
FIG. 2 is a circuit diagram showing the DLL section shown in FIG. 1.

FIG. 2 shows a circuit diagram of the DLL section 40. As shown in FIG. 2, the DLL section 40 includes a high accuracy delay section (DLL reference section) 41, a DLL delay section 42, an amplifier 43, and a capacitor element 44. Note that the amplifier 43 and the capacitor element 44 compose a DLL comparator section 45 described in the claims.

The high accuracy delay section 41 has a highly accurate reference delay amount. The high accuracy delay section 41 generates the reference delay clock Cref2 which is the reference clock Cref delayed by this highly accurate reference delay amount. The high accuracy delay section 41 outputs this reference delay clock Cref2 to one input terminal of the amplifier 43.

The DLL delay section 42 includes m DLL partial delay sections $42_1$ to $42_m$. Each of the DLL partial delay sections $42_1$ to $42_m$ is composed of transistors Tr1 to Tr6 and an inverter INV. Each of the transistors Tr1 and Tr4 is a P-type MOSFET and each of the transistors Tr2, Tr3, Try, and Tr6 is an N-type MOSFET.

The transistor Tr1 and the transistor Tr2 are connected to each other in the inverter connection and the reference clock Cref is input to the respective gates thereof (a clock from the DLL partial delay section in the previous stage is input to the DLL partial delay section in the second stage from the input side and in the succeeding stages). The source of the transistor Tr1 is connected to a power source Vcc on the high potential side. On the other side, the transistor Tr3 is connected in cascade between the source of the transistor Tr2 and the GND 5 and the reference delay voltage Vd is input to the gate of the transistor Tr3.

Similarly, the transistor Tr4 and the transistor Tr5 are connected to each other in the inverter connection and the respective gates thereof are connected with the drains of the Tr1 and Tr2. The source of the transistor Tr4 is connected to the power source Vcc on the high potential side. On the other side, the transistor Tr6 is connected in cascade between the source of the transistor Tr5 and the GND 5, and the reference delay voltage Vd is input to the gate of the transistor Tr6. The drains of the transistor Tr4 and the transistor Tr5 are connected to the DLL partial delay section in the succeeding stage via the inverter INV.

By such a configuration, according to the reference delay voltage Vd, the respective resistance values of the transistor Tr3 and Tr6 are determined and the respective delay amounts in the DLL partial delay sections $42_1$ to $42_m$, that is, the delay amount of the DLL delay section 42 is determined. The DLL delay section 42 outputs a DLL clock Cref3 which has a delay amount determined in this manner to the other input terminal of the amplifier 43.

The amplifier 43 functions as a push-pull type current source and generates the reference delay voltage Vd across the terminals of the capacitor element 44 by charging or discharging the capacitor element 44 according to a difference between the phase of the reference delay clock Cref2 from the high accuracy delay section 41 and the phase of the DLL delay clock Cref3 from the DLL delay section 42.

In this manner, the DLL section 40 generates the reference delay voltage Vd having the highly accurate reference delay amount by generating the reference delay voltage Vd to cause the phase of the DLL delay clock Cref3 to coincide with the phase of the reference delay clock Cref2. The DLL section 40 supplies the reference delay voltage Vd to the delay section 50.

Returning to FIG. 1, the delay section 50 generates n delay clocks (delay signals) $Cd_1$ to $Cd_n$ having respective different delay amounts from one another using the trigger voltage Voff2 from the trigger signal generation section 30 according to the reference delay voltage Vd from the DLL section 40.

Figure 3:
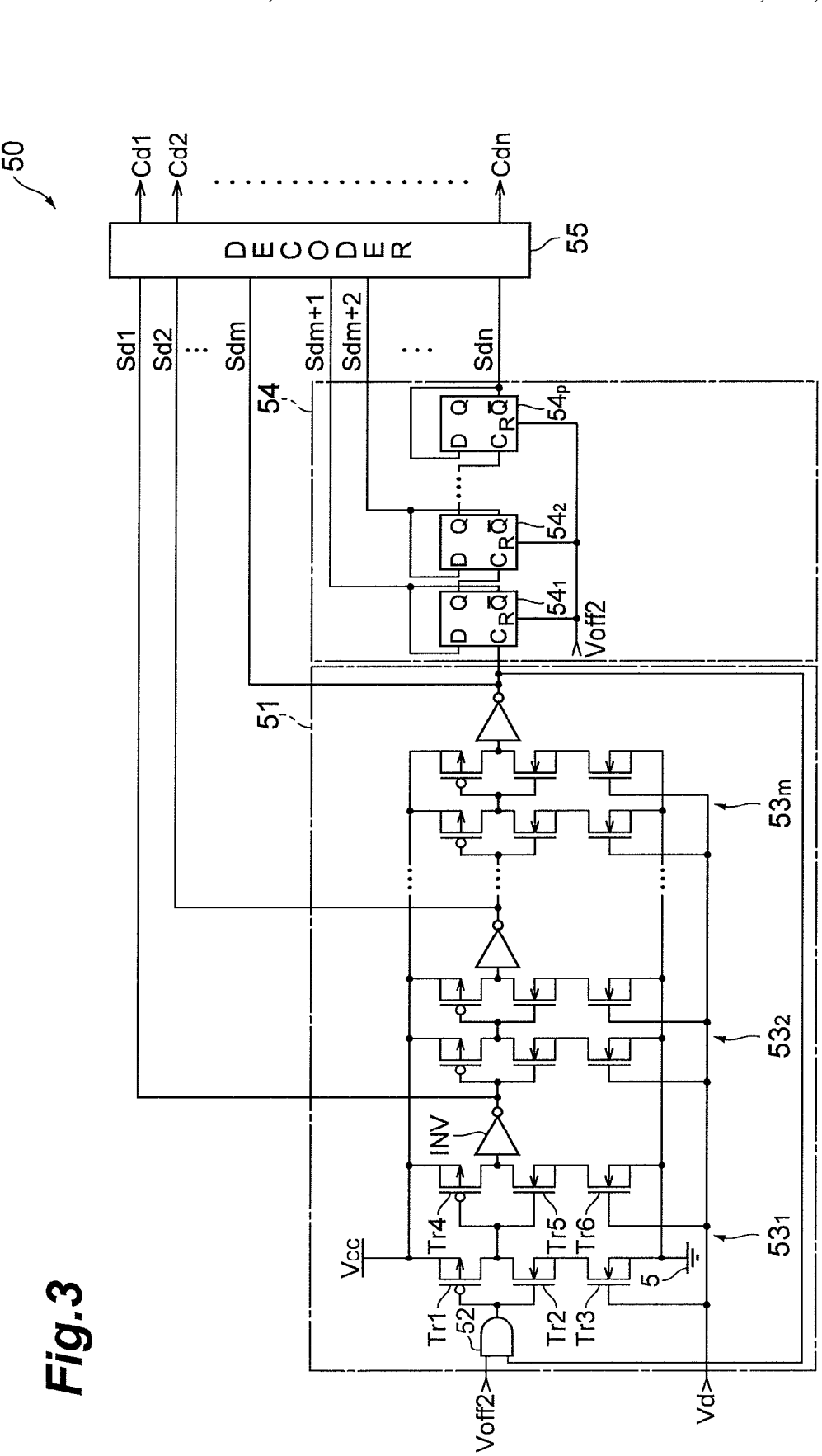
FIG. 3 is a circuit diagram showing the delay section shown in FIG. 1.

FIG. 3 shows a circuit diagram of the delay section 50. As shown in FIG. 3, the delay section 50 includes a delaying delay section 51, a counter section 54, and a decoder 55.

The delaying delay section 51 generates m (m<n) delaying delay signals $Sd_1$ to $Sd_m$ having respective different delay amounts from one another from the trigger voltage Voff2 from the trigger signal generation section 30 according to the reference delay voltage Vd from the DLL section 40. The delaying delay section 51 includes an AND circuit 52, m delaying partial delay sections $53_1$ to $53_m$. The trigger voltage Voff2 is input to one input terminal of the AND circuit 52 and the delaying delay signal $Sd_m$ from the delaying delay section 53 is input to the other input terminal. The output terminal of the AND circuit 52 is connected to the input terminal of the delaying partial delay section $53_1$. Each of the delaying partial delay section $53_1$ to $53_m$ is composed of transistors Tr1 to Tr6 and an inverter INV similarly to each of the DLL partial delay sections $42_1$ to $42_m$.

By such a configuration, according to the reference delay voltage Vd, the respective resistance values of the transistor TR3 and TR6 are determined and the respective delay amounts of the delaying delay sections $53_1$ to $53_m$ are determined. The delaying delay section $53_1$ to $53_m$ supply the delaying delay signals $Sd_1$ to $Sd_m$ having the respective delay amounts determined in this manner to the decoder 55, and also supply the delaying delay signal $Sd_m$ to the input terminal of the counter section 54.

The counter section 54 generates p (p=n−m) frequency-divided signals $Sd_{m+1}$ to $Sd_n$ by frequency-dividing the delaying delay signal $Sd_m$ from the delaying delay section 51. The counter section 54 includes p D-ff sections $54_1$ to $54_p$. The delay signal $Sd_m$ from the delaying delay section 51 is input to the clock terminal of the D-FF section $54_1$ (positive inversion signal from the D-FF section in the previous stage is input to the D-FF section in the second stage from the input side and in the succeeding stages), and the inversion output signal $Sd_{m+1}$ is input to the data input terminal. The positive inversion signal of the D-FF section $54_1$ is supplied to the clock terminal of the D-FF section $54_2$ (D-FF section in the next stage from the D-FF section in the second stage from the input side and in the succeeding stages), and the trigger voltage Voff2 from the trigger signal generation section 30 is input to the reset terminal as a reset signal.

By such a configuration, the D-ff sections $54_1$ to $54_p$ supply the frequency-divided signals $Sd_{m+1}$ to $Sd_n$ which have frequencies 2 times, 4 times, . . . of that of the delaying delay signal $Sd_m$, respectively, to the decoder. Further, the D-ff sections $54_1$ to $54_p$ are reset according to the trigger voltage Voff2 to stop the generation of the frequency-divided signal $Sd_{m+1}$ to $Sd_n$ until the next delaying delay signal $Sd_m$ is input from the delaying delay section 51.

The decoder 55 generates the n delay clocks $Cd_1$ to $Cd_n$ having respective different delay amounts from one another by 1 ns, for example, by decoding the delaying delay signals $Sd_1$ to $Sd_m$ from the delaying delay section 51 and the frequency-divided signals $Sd_{m+1}$ to $Sd_n$ from the counter section 54. These delay clocks $Cd_1$ to $Cd_n$ include a delay clock having a delay amount corresponding to each of the desired first dead time, the desired second dead time, the desired on-time, and the desired minimum off-time.

Here, the desired on-time, that is, the on-pulse width Ton can be set by the following formula using the input voltage value Vin, the output voltage value Vout, and the desired switching frequency f.

$$Ton=(1/f)\times(Vout/Vin)$$

For example, when Vin=5 V, Vout=1 V, and the switching frequency is desired as f=500 kHz, the on-pulse width Ton may be set as Ton=400 ns. At this time, preferably the desired first dead time and the desired second dead time are approximately 40 ns, and preferably the desired minimum off-time is approximately 200 ns.

Thereby, for example, the delay section 50 generates the n delay clocks $Cd_1$ to $Cd_n$ including a trigger delay clock (trigger delay signal) $Cd_1$ delayed form the trigger voltage Voff2 by 1 ns of the minimum delay amount, a first dead time delay clock (first dead time delay signal) $Cd_{41}$ delayed from this trigger delay clock $Cd_1$ by a delay amount of 40 ns corresponding to the desired first dead time, an on-time delay clock (on-time delay signal) $Cd_{441}$ delayed from this first dead time delay clock $Cd_{41}$ by a delay amount of 400 ns corresponding to the desired on-time, a second dead time delay clock (second dead time signal) $Cd_{481}$ delayed from this on-time delay clock $Cd_{441}$ by a delay amount of 40 ns corresponding to the desired second dead time, and a minimum off-time delay clock (minimum off-time delay signal) $Cd_{681}$ delayed from this second dead time delay clock $Cd_{481}$ by a delay amount of 200 ns corresponding to the desired minimum off-time, and supplies the n delay clocks $Cd_1$ to $Cd_n$ to the timing control section 60.

Returning to FIG. 1, the timing control section 60 generates the switching control signals $S_{SWHG}$ and $S_{SWLG}$ using the trigger delay clock $Cd_1$, the first dead time delay clock $Cd_{41}$, the on-time delay clock $Cd_{441}$, the second dead time delay clock $Cd_{481}$, the minimum off-time delay clock $Cd_{681}$, and the delay clock $Cd_n$ having the maximum delay amount, among the delay clocks $Cd_1$ to $Cd_n$ from the delay section 50.

Figure 4:
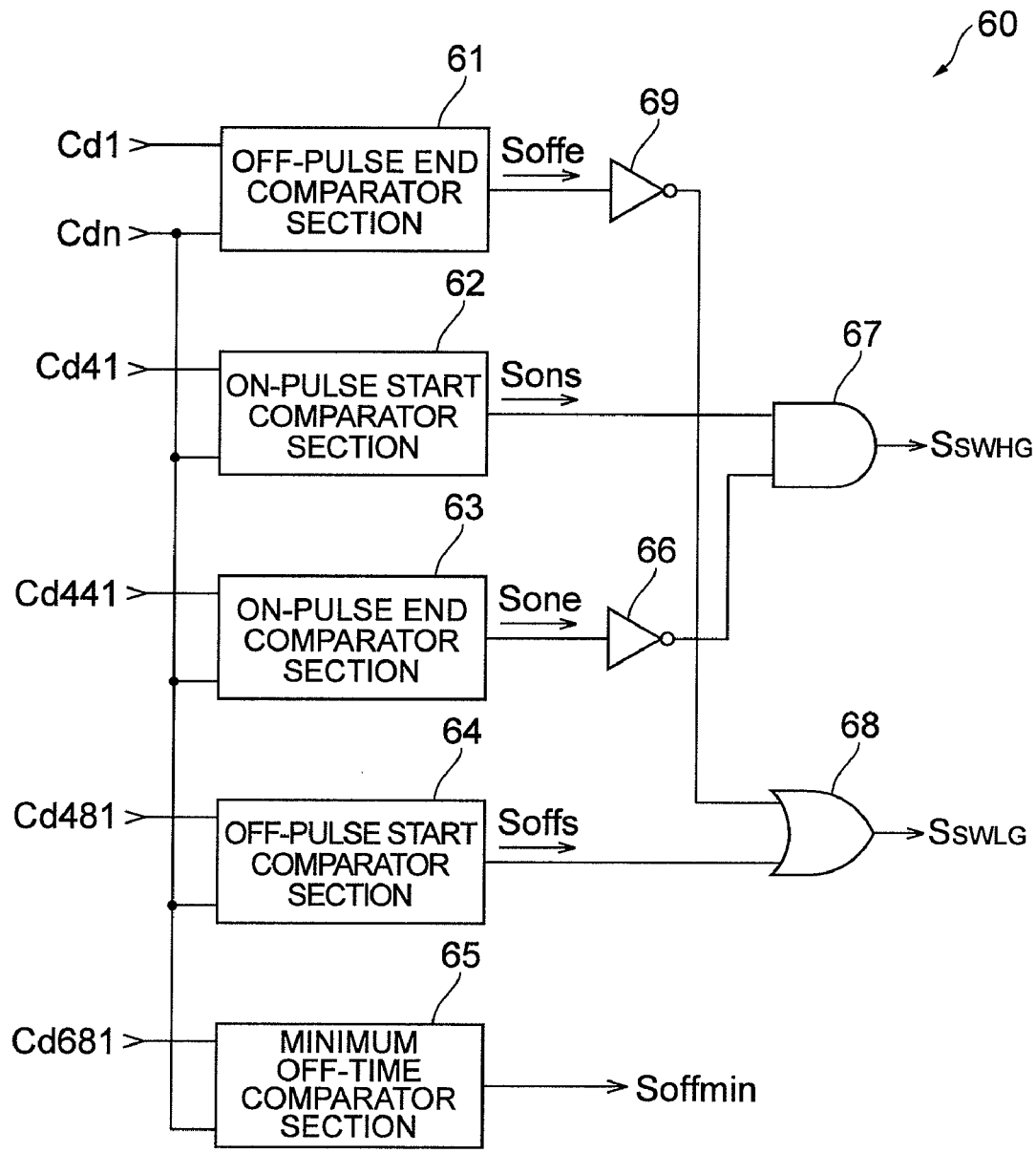
FIG. 4 is a circuit diagram showing the timing control section shown in FIG. 1.

FIG. 4 shows a circuit diagram of the timing control section 60. As shown in FIG. 4, the timing control section 60 is configured as a decoder and includes an off-pulse end comparator section 61, an on-pulse start comparator section 62, an on-pulse end comparator section 63, an off-pulse start comparator section 64, a minimum off-time comparator section 65, inverters 66 and 69, an on-pulse AND circuit (on-pulse logic operation section) 67, and an off-pulse OR circuit (off-pulse logic operation section) 68.

The delay clock $Cd_n$ is input to one input terminal of the off-pulse end comparator section 61 and the trigger delay clock $Cd_1$ is input to the other input terminal. The off-pulse end comparator section 61 generates an off-pulse end signal Soffe indicating the off-pulse end time point in the switching control signal $S_{SWLG}$ in response to this trigger delay clock $Cd_1$.

The delay clock $Cd_n$ is input to one input terminal of the on-pulse start comparator section 62 and the first dead time delay clock $Cd_{41}$ is input to the other input terminal. The on-pulse start comparator section 62 generates an on-pulse start signal Sons indicating the on-pulse start time point in the switching control signal $S_{SWHG}$ in response to the first dead time delay clock $Cd_{41}$.

The delay clock $Cd_n$ is input to one input terminal of the on-pulse end comparator section 63 and the on-time delay clock $Cd_{441}$ is input to the other input terminal. The on-pulse end comparator section 63 generates an on-pulse end signal Sone indicating the on-pulse end time point in the switching control signal $S_{SWHG}$ in response to this on-time delay clock $Cd_{441}$.

The delay clock $Cd_n$ is input to one input terminal of the off-pulse start comparator section 64 and the second dead time delay clock $Cd_{481}$ is input to the other input terminal. The off-pulse start comparator section 64 generates an off-pulse start signal Soffs indicating the off-pulse start time point in the switching control signal $S_{SWLG}$ in response to this second dead time delay clock $Cd_{481}$.

The delay clock $Cd_n$ is input to one input terminal of the minimum off-time comparator section 65 and the minimum off-time delay clock $Cd_{681}$ is input to the other input terminal. The minimum off-time comparator section 65 generates a minimum off-time signal Soffmin in response to this minimum off-time delay clock $Cd_{681}$.

The on-pulse AND circuit 67 obtains a logic product of the on-pulse start signal Sons from the on-pulse start comparator section 62 and a signal obtained by inversion of the inverter 66 from the on-pulse end signal Sone output from the on-pulse end comparator section 63 and generates the on-pulse in the switching control signal $S_{SWHG}$. In this manner, the start time point and the end time point of the on-pulse in the switching control signal $S_{SWHG}$ are determined.

The off-pulse OR circuit 68 obtains a logic sum of a signal obtained by inversion of the inverter 69 from the off-pulse end signal Soffe output from the off-pulse end comparator section 61 and the off-pulse start signal Soffs from the off-pulse start comparator section 64 and generates the off pulse in the switching control signal $S_{SWLG}$. In this manner, the start time point and the end time point of the off-pulse in the switching control signal $S_{SWLG}$ are determined.

In this manner, the timing control section 60 generates the switching control signals $S_{SWHG}$ and $S_{SWLG}$ having the dead time of 40 ns, the on-time of 400 ns, and a minimum off-time of 200 ns.

Figure 5:
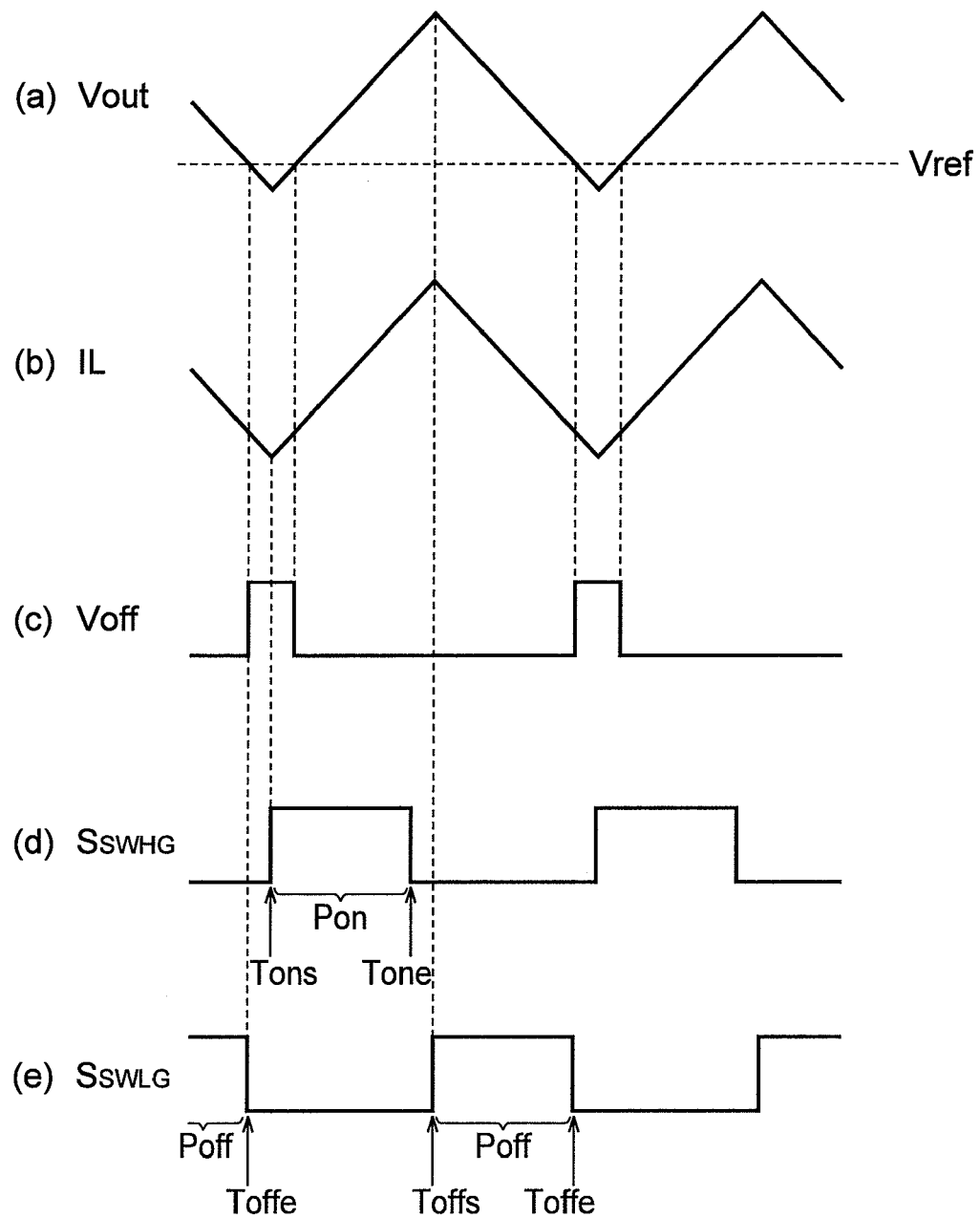
FIG. 5 is a timing chart showing each signal waveform in a comparator type DC-DC converter according to a first embodiment.
Figure 6:
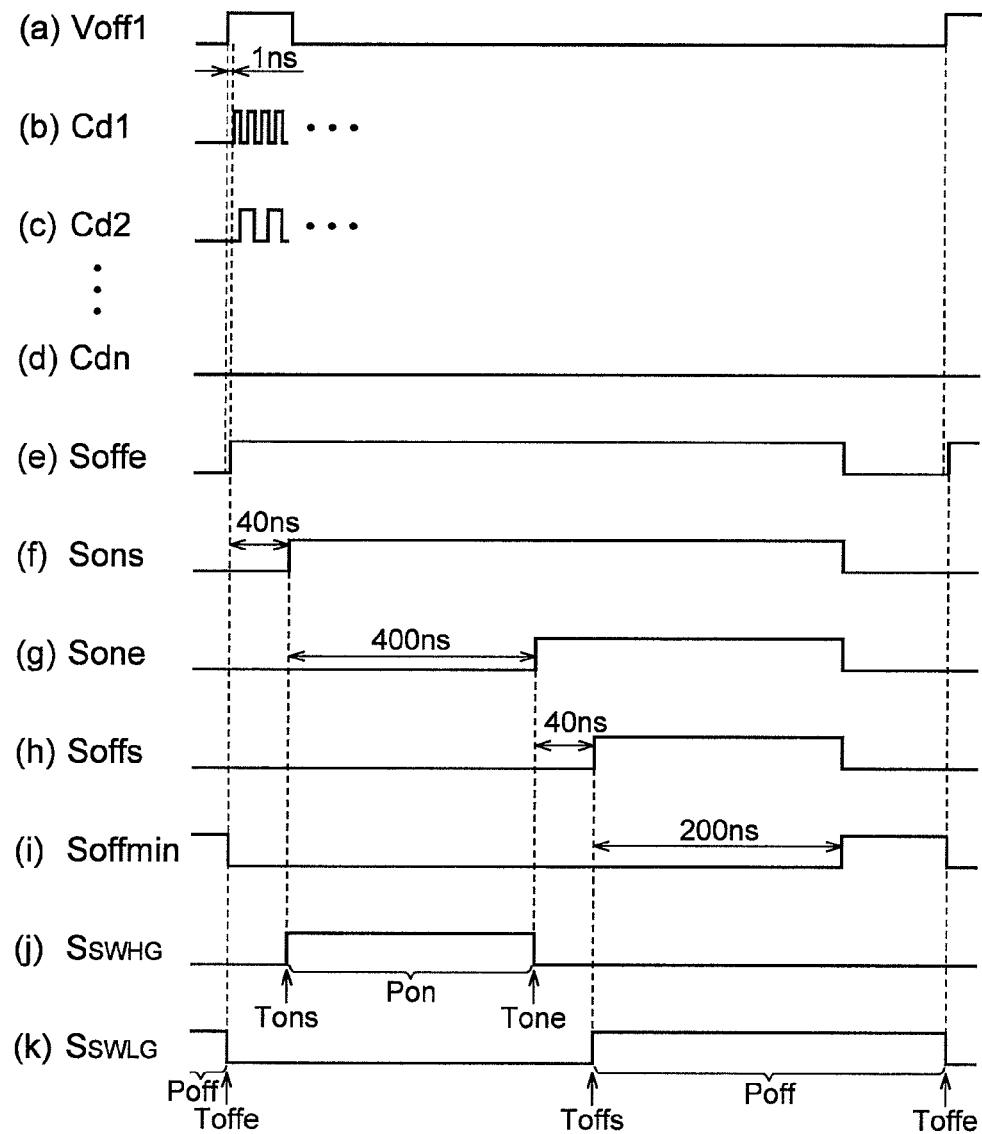
FIG. 6 is a timing chart showing each signal waveform of a control unit in a comparator type DC-DC converter of a first embodiment.

Next, the operation of the DC-DC converter 1 will be explained. FIG. 5 is a timing chart showing each signal waveform in the DC-DC converter 1. FIG. 6 is a timing chart showing each waveform in the control unit 200 of the DC-DC converter 1.

When the output voltage Vout is reduced and reaches the reference voltage Vref (FIG. 5(a)), the comparator 20 of the control unit 200 generates the high-level pulse voltage Voff1 (FIG. 5(c) and FIG. 6(a)). At this time, if the timing control section 60 has generated the minimum off-time signal Soffmin, the trigger signal generation section 30 generates the high-level trigger voltage Voff2, and the delay section 50 generates the n delay clocks $Cd_1$ to $Cd_n$ which are delayed at 1 ns interval according to the reference delay voltage Vd from the DLL section 40 (FIGS. 6(b) to 6(d)).

First, when the delay section 50 generates the trigger delay clock $Cd_1$ delayed by 1 ns, the off-pulse end comparator section 61 of the timing control section 60 generates the off-pulse end signal Soffe (FIG. 6(e)), and the off-pulse AND circuit 68 ends the generation of the off-pulse Poff in the switching control signal $S_{SWLG}$ at the end time point Toffe of the off-pulse Poff (FIG. 6(k) and FIG. 5(e)). Then, the switching element 12 comes to have an off-state.

After that, when the delay section 50 generates the first dead time delay clock $Cd_{41}$ which is delayed by the first dead time of 40 ns, the on-pulse start comparator section 62 of the timing control section 60 generates the on-pulse start signal Sons (FIG. 6(f)), and the on-pulse AND circuit 67 starts the generation of the on-pulse Pon in the switching control signal $S_{SWHG}$ at the start time point Tons of the on-pulse Pon (FIG. 6(j) and FIG. 5(d)). Then, the switching element 11 comes to have an on-state, and coil current IL is increased (FIG. 5(b)) and the output voltage Vout is increased (FIG. 5(a)).

After that, when the delay section 50 generates the on-time delay clock $Cd_{441}$ which is delayed by the on-time of 400 ns, the on-pulse end comparator section 63 of the timing control section 60 generates the on-pulse end signal Sone (FIG. 6(g)), and the on-pulse AND circuit 67 ends the generation of the on-pulse Pon in the switching control signal $S_{SWHG}$ (FIG. 6(j) and FIG. 5(d)) at the end time point Tone of the on-pulse Pon. Then, the switching element 11 comes to have the off-state.

After that, when the delay section 50 generates the second dead time delay clock $Cd_{481}$ which is delayed by the second dead time of 40 ns, the off-pulse start comparator section 64 of the timing control section 60 generates the off-pulse start signal Soffs (FIG. 6(h)), and the off-pulse OR circuit 68 starts the generation of the off-pulse Poff in the switching control signal $S_{SWLG}$ at the start time point Toffs of the off-pulse Poff (FIG. 6(k) and FIG. 5(e)). Then, the switching element 12 comes to have the on-state, and the coil current IL is reduced (FIG. 5(b)) and the output voltage Vout is reduced (FIG. 5(a)).

After that, when the delay section 50 generates the minimum off-time delay clock $Cd_{681}$ which is delayed by the minimum off-time of 200 ns, the minimum off-time signal Soffmin is generated (FIG. 6(i)). Thereby, the above operation can be repeated in the next time when the output voltage Vout is reduced and reaches the reference voltage Vref again and the comparator 20 generates the high-level pulse voltage Voff1. Note that, by providing the minimum off-time of 200 ns, it is possible to prevent the comparator 20 to be erroneously operated by the variation and noise caused in the switching of the switching elements 11 and 12 as described above and as will be described below.

In this manner, the pulse width of the on-pulse Pon is set at the fixed on-time of 400 ns.

Further, the dead time of 40 ns is provided between the on-pulse Pon and the off-pulse Poff and also the dead time of 40 ns is provided between the off-pulse Poff and the on-pulse Pon, and the switching elements 11 and 12 are prevented from being turned on at the same time. That is, breakthrough current is prevented from flowing in the switching elements 11 and 12. As a result, it is possible to improve the power conversion efficiency.

Further, the minimum off-time of 200 ns is set and the pulse width of the off-pulse Poff is prevented from being reduced smaller than 200 ns. Here, in the comparator type DC-DC converter, sometimes the power source voltage varies at the high potential side due to operation state switching of the drive circuit for driving the switching element when On an Off are switched in the switching element. In particular, when the switching element of the high-side is switched from On to OFF and the switching element of the low-side is switched from OFF to ON, that is, when the output voltage is reduced from the reference voltage, the comparator is operated. At this time, when the power source voltage and the reference voltage vary due to the variation of the high potential side power source voltage, there is a possibility that the comparator is erroneously operated. However, since the minimum off-time of 200 ns is set in the DC-DC converter, the generation of the on-pulse does not start until the respective variations in the high potential side power source voltage and the reference voltage are reduced. That is, the off-pulse generation is continued during the minimum off-time of 200 ns even if the comparator 20 is erroneously operated.

In this DC-DC converter 1 of the first embodiment, the DLL section 40 and the delay section 50, which determines the dead time, the on-time, and the minimum off-time, can be configured with a DSP (Digital Signal Processor), for example, and thereby it is possible to realize the size and cost reduction of the control unit 200 compared with a case of using plural conventional analog type delay circuits each composed of a resistor element and a capacitor element. Further, the entire control unit 200 may be configured with a DSP. In this case, the output voltage Vout of the control unit 200 can be configured by an AD conversion section performing AD conversion and the DSP.

Further, in the DC-DC converter 1 of the first embodiment, since the delay section 50 determines the dead time, the on-time, and the minimum off-time according to the reference delay voltage Vd from the DLL section 40, it is possible to improve the respective accuracies of the dead time, the on-time, and the minimum off-time which are determined by the delay section 50, only by improving the accuracy of the reference delay amount in this reference delay voltage Vd, that is, only by improving the accuracy of the DLL section 40. Accordingly, it is possible to improve the respective accuracies of the dead time, the on-time, and the minimum off-time without preventing the reduction of the size and the cost compared with a case of using a trimming circuit element for each of the plural conventional analog type delay circuits.

Further, in the DC-DC converter 1 of the first embodiment, it is possible to generate the reference delay voltage Vd having the highly accurate reference delay amount, only by improving the accuracy of the high accuracy delay section 41 of the DLL section 40. Accordingly, it is possible to improve the respective accuracies of the dead time, the on-time, and the minimum off-time without preventing the reduction of the size and the cost.

Further, in the DC-DC converter 1 of the first embodiment, since the counter section 54 of the delay section 50 generates the frequency-divided signals $Sd_{m+1}$ to $Sd_n$ of the delaying delay signal $Sd_1$ to $Sd_m$ generated by the delaying delay section 51, it is possible to reduce the number of delay signals generated by the delaying delay section 51 in the signals for generating the necessary delay clocks $Cd_1$ to $Cd_n$. That is, it is possible to reduce the circuit size of the delaying delay section 51. Accordingly, the size and cost of the control unit 200 can be further reduced.

Further, in the DC-DC converter 1 of the first embodiment, the timing control section 60 can be configured with the same DSP as the DSP configuring the DLL section 40 and the delay section 50, for example, and the size and cost of the control unit 200 can be further reduced.

Second Embodiment

Figure 7:
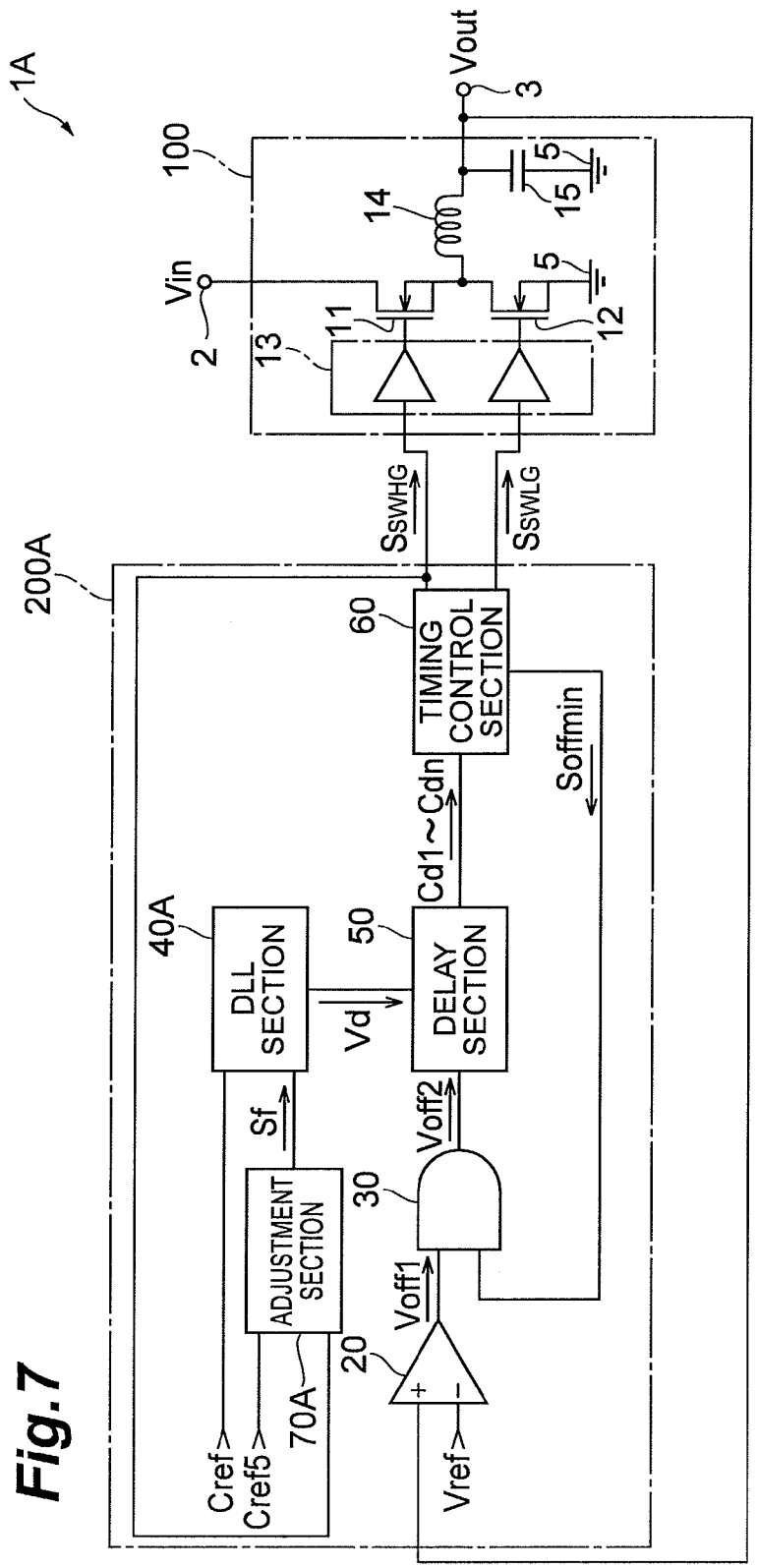
FIG. 7 is a circuit diagram showing a comparator type DC-DC converter according to a second embodiment of the present invention.

FIG. 7 is a circuit diagram showing a comparator type DC-DC converter using a synchronous rectification method according to a second embodiment of the present invention. The DC-DC converter 1A shown in FIG. 7 is different from the first embodiment in the configuration of providing a control unit 200A for the DC-DC converter 1 instead of the control unit 200.

The control unit 200A is different from the control unit 200 in the point that the control unit 200A is provided with a DLL section 40A instead of the DLL section 40 in the control unit 200 and further provided with an adjustment section 70A. The other configuration of the control unit 200A is the same as that of the control unit 200.

The adjustment section 70A receives the switching control signal $S_{SWHG}$ (or $S_{SWLG}$) and also receives a reference clock Cref5. The adjustment section 70A compares the switching control signal $S_{SWHG}$ (or $S_{SWLG}$) and the reference clock Cref5, and adjusts the predetermined on-width of the on-pulse according to this result so as to cause the frequency of the switching control signals $S_{SWHG}$ and $S_{SWLG}$ to become constant. Specifically, the adjustment section 70A counts the on-pulses in the switching control signal $S_{SWHG}$ (or off-pulses in the switching control signal $S_{SWLG}$) and also counts the reference clocks Cref5, and generates a frequency control signal Sf for adjusting the predetermined on-width of the on-pulse so as to cause the count value of the switching control signal $S_{SWHG}$ (or $S_{SWLG}$) and the count value of the reference clocks Cref5 to become equal. In the comparator type DC-DC converter according to the present embodiment, the frequency control signal Sf is configured to be a digital signal having 4 bits.

Figure 8:
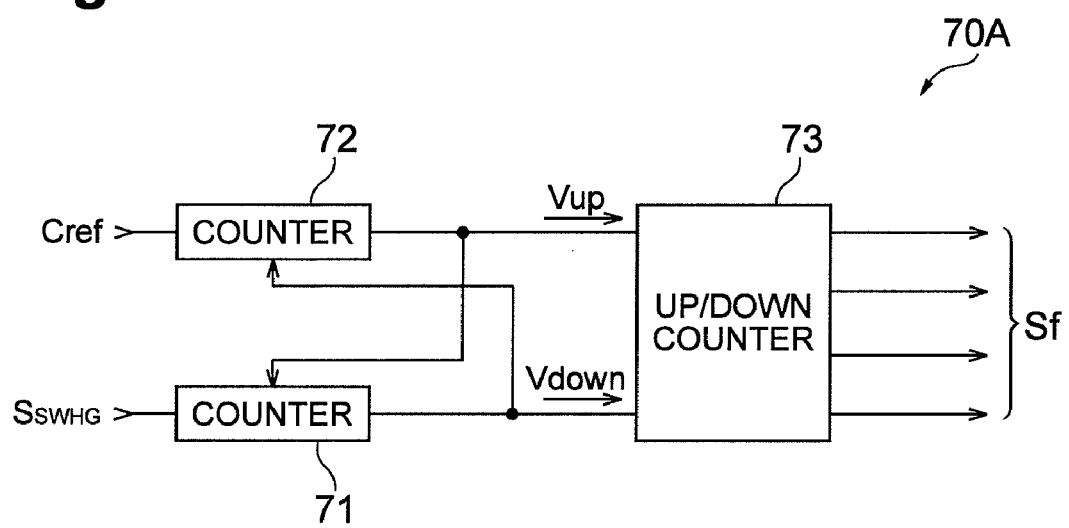
FIG. 8 is a circuit diagram showing the adjustment section shown in FIG. 7.

FIG. 8 is a circuit diagram showing the adjustment section 70A shown in FIG. 7. The adjustment section 70A shown in FIG. 8 includes two counters 71 and 72 and an up/down counter 73.

The switching control signal $S_{SWHG}$ is input to the input terminal of the first counter 71 and an output voltage of the second counter 72 is input to the reset terminal. For example, the first counter 71 is a 4 bit counter. The first counter 71 counts the on-pulses of the switching control signal $S_{SWHG}$ and, when the count value takes the maximum value "1111", outputs a high-level pulse voltage and also resets the output voltage in the count next to the count of "1111". Further, the first counter 71 resets the output voltage also when the output voltage of the second counter 72 comes to have a high level. The output terminal of the first counter 71 is connected to one input terminal of the up/down counter 73.

The reference clock Cref5 is input to the input terminal of the second counter 72 and the output voltage of the first counter 71 is input to the reset terminal. For example, the second counter 72 is a 4 bit counter. The second counter 72 counts the cycles of the reference clock Cref5, and, when the count value takes the maximum value "1111", outputs a high level pulse voltage and also resets the output voltage in the count next to the count of "1111". Further, the second counter 72 resets the output voltage also when the output of the first counter 71 comes to have a high level. The output terminal of the second counter 72 is connected to the other input terminal of the up/down counter 73.

The up/down counter 73 receives the pulse voltage from the first counter 71 or the pulse voltage from the second counter 72, Vdown or Vup, and increases or decreases the count value. In the present embodiment, the up/down counter 73 decreases the count value when the high level pulse voltage Vdown is input from the first counter 71 and increase the count value when the high level pulse voltage Vup is input from the second counter 72. The up/down counter 73 outputs the 4 bit digital frequency control signal Sf to the DLL section 40A.

Figure 9:
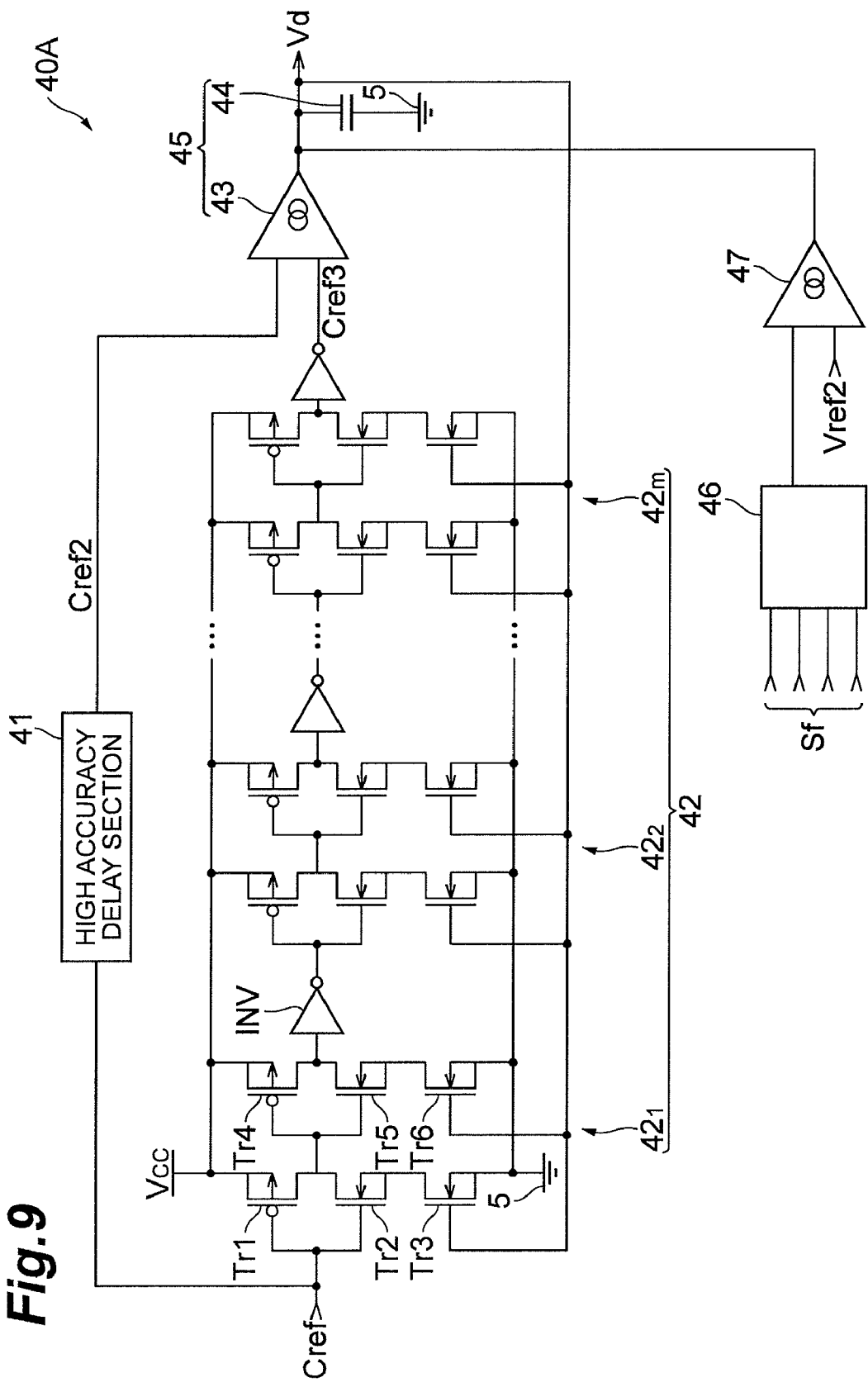
FIG. 9 is a circuit diagram of the delay section shown in FIG. 7.

FIG. 9 is a circuit diagram showing the DLL section 40A. The DLL section 40A shown in FIG. 9 is different from the DLL section 40 in the configuration of providing a digital/analog conversion section (hereinafter, called DAC) 46 and an amplifier 47 for the DLL section 40.

The DAC 46 provides the frequency control signal Sf from the adjustment section 70A with digital/analog conversion and output the converted value to one input terminal of the amplifier 47. The reference voltage Vref2 is input to the other input terminal of the amplifier 47. The amplifier 47 functions as a push-pull type current source, and, for example, supplies current to a capacitor element 44 when the frequency control signal Sf exhibits a value equal to or larger than the reference voltage Vref2 and pulls current from the capacitor element 44 when the frequency control signal Sf exhibits a value smaller than the reference voltage Vref2. That is, the amplifier 47 increases the value of the reference delay voltage Vd when the frequency control signal Sf exhibits a value equal to or larger than the reference voltage Vref2 and decreases the value of the reference delay voltage Vd when the frequency control signal Sf exhibits a value smaller than the reference voltage Vref2.

Also this DC-DC converter 1A of the second embodiment is provided with a configuration similar to the DC-DC converter 1 of the first embodiment, and thereby can obtain an advantage similar to the DC-DC converter 1 of the first embodiment.

Here, for example, when environmental temperature is increased, the internal resistance of a circuit element is increased and the internal loss thereof is increased. At this time, in the comparator type DC-DC converter, the off-pulse width is reduced and the on-duty is increased for compensating the output voltage reduction due to the internal loss increase. In this manner, in the comparator type DC-DC converter, the switching frequency varies gradually due to the environmental temperature variation. Moreover, the respective variations of the input voltage, output voltage, and output current vary the off-pulse width and vary the switching frequency. The variation of the switching frequency varies a ripple of the output voltage and there is a possibility that a circuit of the succeeding stage such as a PU is operated erroneously. Further, there is a possibility that EMI countermeasures are required across a wide frequency band.

However, in the DC-DC converter 1A of the second embodiment, when the environmental temperature is reduced, for example, the respective internal resistances of the switching elements 11 and 12 and the coil 14 and the like, for example, are reduced and the internal loss is reduced. At this time, the off-width of the off-pulse Poff is increased and the on-duty is reduced for compensating the increase of the output voltage Vout. On the other hand, the predetermined on-width of the on-pulse Pon is adjusted by the adjustment section 70A.

Figure 10:
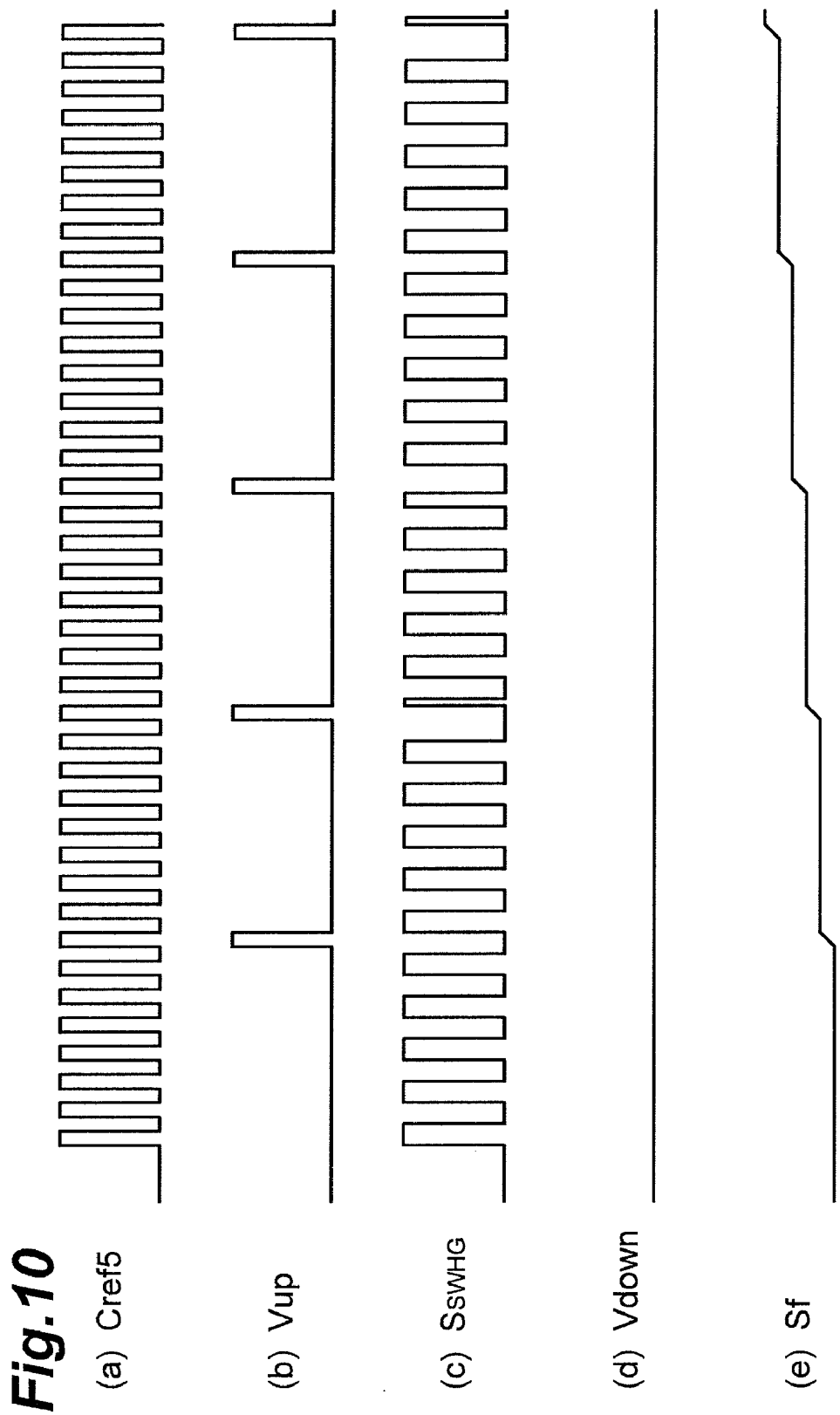
FIG. 10 is a timing chart showing each signal waveform of the adjustment section shown in FIG. 8.

Specifically, since the switching frequency of the switching control signals $S_{SWHG}$ and $S_{SWLG}$ is lower than the frequency of the reference clock Cref5 (FIGS. 10(a) and 10(c)), the second counter 72 finishes the counting earlier than the first counter 71 and outputs the high level pulse voltage Vup (FIG. 10(b)). On the other hand, the output voltage Vdown of the first counter 71 is kept at the low level (FIG. 10(d)). As a result, the up/down counter 73 increases the value of the frequency control signal Sf (FIG. 10(e)).

Then, the amplifier 47 supplies the current, which is proportional to a voltage difference between the frequency control signal Sf and the reference voltage Vref2, to the capacitor element 44 and the reference delay voltage Vd is increased. Thereby, the delay amount in the delay section 50 is reduced and the on-time, the first and second dead time, and the minimum off-time are reduced. As a result, the on-width of the on-pulse Pon is reduced and, since the on-duty is determined by Vin and Vout, the off-width of the off-pulse Poff is also reduced resulting in the increase of the switching frequency. In this manner, the adjustment section 70A performs the control so as to make the switching frequency close to the frequency of the reference clock Cref5, and thereby the variation of the switching frequency is reduced.

On the other hand, when the environmental temperature is increased, for example, the respective internal resistances of the switching elements 11 and 12, the coil 14 and the like, for example, are increased and the internal loss is increased. At this time, the off-width of the off-pulse Poff is reduced and the on-duty is increased for compensating the reduction of the output voltage Vout. On the other hand, the predetermined on width of the on-pulse Pon is adjusted by the adjustment section 70A.

Specifically, since the switching frequency of the switching control signals $S_{SWHG}$ and $S_{SWLG}$ is higher than the frequency of the reference clock Cref5, the first counter 71 finishes the counting earlier than the second counter 72 and outputs the high level pulse voltage Vdown. On the other hand, the output voltage Vup of the second counter 72 is kept at the low level. As a result, the up/down counter 73 reduces the value of the frequency control signal Sf.

Then, the amplifier 47 pulls the current, which is proportional to a voltage difference between the frequency control signal Sf and the reference voltage Vref2, from the capacitor element 44 and the reference delay voltage Vd is reduced. Thereby, the delay amount in the delay section 50 is increased and the on-time, the first and second dead time, and the minimum off-time are increased. As a result, the on-width of the on-pulse Pon is increased and, since the on-duty is determined by Vin and Vout, the off-width of the off-pulse Poff is also increased resulting in the reduction of the switching frequency. In this manner, the adjustment section 70A performs the control so as to make the switching frequency close to the frequency of the reference clock Cref5, and thereby the variation of the switching frequency is reduced.

In this manner, in the comparator type DC-DC converter 1A of the second embodiment, it is possible to reduce the variation of the switching frequency which is caused by the conversion loss variation due to the environmental temperature variation and the like, the input and output voltage variation, and the output current variation without deteriorating a response characteristic for abrupt increase of the load current. As a result, it is possible to reduce the ripple variation of the output voltage and to prevent a circuit in the succeeding stage such as a PU from being erroneously operated. Further, the EMI countermeasures become unnecessary for a wide frequency band and the EMI countermeasures can be carried out easily and inexpensively.

Note that the present invention is not limited to the above described embodiments and can be modified variously.

While, in the second embodiment, the frequency of the reference clock Cref5 in the adjustment section 70A is configured to be the same as the frequency of the switching control signal $S_{SWHG}$, the ratio of the frequency of the reference clock Cref5 and the frequency of the switching control signal $S_{SWHG}$ may be N:M (M and N are natural numbers). At this time, the adjustment section 70A adjusts the predetermined on-width of the on-pulse Pon in the switching control signal $S_{SWHG}$ so as to cause the count value of the switching control signal $S_{SWHG}$ and the count value of the reference clocks Cref5 to be M:N. In particular, preferably the frequency of the reference clock Cref5 is lower than the frequency of the switching control signal $S_{SWHG}$. Thereby, the consumption current can be reduced.

Further, while, in the second embodiment, the first counter 71 counts the on-pulses in the switching control signal $S_{SWHG}$, the first counter 71 may count the off-pulses in the switching control signal $S_{SWLG}$.

Further, while, in the second embodiment, the adjustment section 70A adjusts the reference delay voltage Vd in the DLL section 40A for making the frequency constant, the adjustment section 70A may adjusts only the on-time delay clock $Cd_{441}$ in the delay section 50. Thereby, it is possible to make the frequency constant by varying only the on-time while keeping the dead time and the minimum off-time constant.

Further, while, in the present embodiments, an N-type MOSFET is used as the switching element 11 in the voltage conversion unit 100, a P-type MOSFET may be used. Moreover, various transistors such as an FET and a bipolar transistor can be applied to the switching element and the transistor in the present embodiments.

INDUSTRIAL APPLICABILITY

The present invention can be applied to a use for improving the respective accuracies of the on-time, the minimum off-time, and the dead time in the comparator type DC-DC converter using the synchronous rectification without preventing the reduction of the size and the cost thereof.

DESCRIPTION OF THE REFERENCE NUMERALS 11, 12 Switching element
13 Drive circuit
14 Coil
15 Capacitor element
20 Comparator
30 Trigger signal generation section
40, 40A DLL section
41 High accuracy delay section (DLL reference section)
42 DLL delay section
$42_1$ to $42_m$ DLL partial delay section
43 Amplifier
44 Capacitor element
45 DLL comparator section
46 DAC
47 Amplifier
50 Delay section
51 Delaying delay section
52 AND circuit
$53_1$ to $53_m$ Delaying partial delay section
54 Counter section
$54_1$ to $54_p$ D-FF section
60 Timing control section
61 Off-pulse end comparator section
62 On-pulse start comparator section
63 On-pulse end comparator section
64 Off-pulse start comparator section
65 Minimum off-time comparator section
66 Inverter
67 On-pulse AND circuit (On-pulse logic operation section)
68 Off-pulse OR circuit (Off-pulse logic operation section)
70A Adjustment section
71, 72 Counter
73 Up/down counter
100 Voltage conversion unit
200, 200A Control unit

The invention claimed is:
1. A comparator-type DC-DC converter using a synchronous rectification method, the converter comprising:
a voltage conversion unit which includes a switching element and generates an output voltage obtained by voltage-converting an input voltage by controlling the switching element according to a control signal; and
a control unit generating the control signal for stabilizing the output voltage of the voltage conversion unit,
the control unit including:
a comparator detecting that the output voltage of the voltage conversion unit becomes smaller than a reference voltage;
a trigger signal generation section generating a trigger signal when receiving an output signal from the comparator after having received a minimum off-time signal;
a DLL section generating a reference delay clock which is a reference clock delayed by a reference delay amount and also generating a reference delay signal having a value corresponding to the reference delay amount;
a delay section generating: a trigger delay signal which is delayed from the trigger signal output from the trigger signal generation section by a predetermined delay amount; a first dead time delay signal which is delayed from the trigger delay signal by a delay amount corresponding to a desired first dead time; an on-time delay signal which is delayed from the first dead time delay signal by a delay amount corresponding to a desired on-time; a second dead time delay signal which is delayed from the on-time delay signal by a delay amount corresponding to a desired second dead time; and a minimum off-time delay signal which is delayed from the second dead time delay signal by a delay amount corresponding to a desired minimum off-time, according to the reference delay signal from the DLL section; and a timing control section: determining an end time point of an off-pulse in the control signal according to the trigger delay signal from the delay section; determining a start time point of an on-pulse in the control signal according to the first dead time delay signal from the delay section; determining an end time point of the on-pulse according to the on-time delay signal from the delay section; determining a start time point of the off-pulse according to the second dead time delay signal from the delay section; and generating the minimum off-time signal according to the minimum off-time delay signal from the delay section.

2. The comparator type DC-DC converter using a synchronous rectification method according to claim 1, wherein the DLL section includes:

a DLL reference section generating the reference delay clock which is the reference clock delayed by the reference delay amount;

a DLL delay section generating a DLL delay clock which is the reference clock delayed according to the reference delay signal; and a DLL comparator section generating the reference delay signal having a value corresponding to a difference between the phase of the reference delay clock and the phase of the DLL delay clock, and wherein the DLL section generates the reference delay signal having the value corresponding to the reference delay amount by generating the reference delay signal so that the phase of the DLL delay clock coincides with the phase of the reference delay clock.

3. The comparator type DC-DC converter using a synchronous rectification method according to claim 1, wherein the delay section includes:

a delaying delay section generating plural delaying delay clocks which have different delay amounts from the trigger signal output from the trigger signal generation section according to the reference delay signal from the DLL section; and a counter section generating frequency-divided clocks which are obtained by frequency-dividing the plural delaying delay clocks from the delaying delay section, and wherein the delay section determines the trigger delay signal, the first dead time delay signal, the on-time delay signal, the second dead time delay signal, and the minimum off-time delay signal from the plural delaying delay clocks and the frequency-divided clocks.

4. The comparator type DC-DC converter using a synchronous rectification method according to claim 1, wherein the timing control section includes:

an off-pulse end comparator section generating an off-pulse end signal indicating an end time point of the off-pulse in the control signal according to the trigger delay signal from the delay section;

an on-pulse start comparator section generating an on-pulse start signal indicating a start time point of the on-pulse in the control signal according to the first dead time delay signal from the delay section;

an on-pulse end comparator section generating an on-pulse end signal indicating an end time point of the on-pulse according to the on-time delay signal from the delay section;

an off-pulse start comparator section generating an off-pulse start signal indicating a start time point of the off-pulse according to the second dead time delay signal from the delay section;

a minimum off-time comparator section generating the minimum off-time signal according to the minimum off-time delay signal from the delay section;

an on-pulse logic operation section generating the on-pulse in the control signal by performing logic operation between the on-pulse start signal and the on-pulse end signal; and an off-pulse logic operation section generating the off-pulse in the control signal by performing logic operation between the off-pulse end signal and the off-pulse start signal.

* * * * *